Dec. 6, 1938.  G. E. WAGNER  2,138,990
COOLING DEVICE FOR ELECTRIC GENERATORS
Filed Jan. 6, 1937   2 Sheets—Sheet 1

INVENTOR
GEORGES ERNEST WAGNER
By Young, Emery & Thompson
ATTORNEYS

Dec. 6, 1938.  G. E. WAGNER  2,138,990
COOLING DEVICE FOR ELECTRIC GENERATORS
Filed Jan. 6, 1937   2 Sheets-Sheet 2
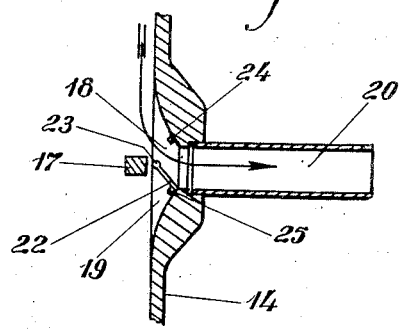
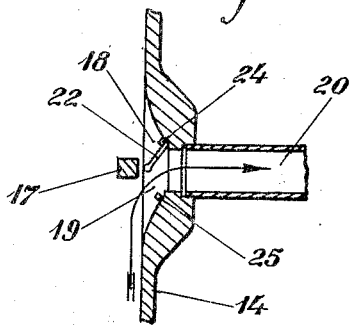
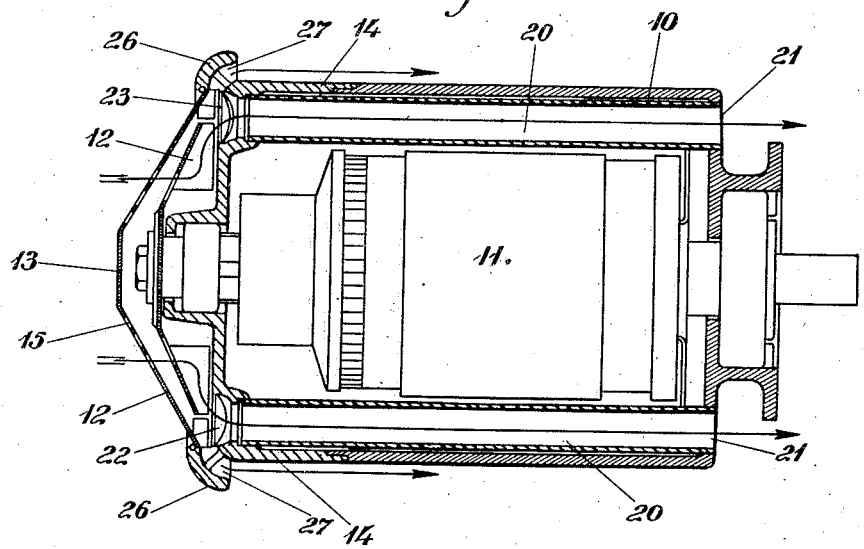
INVENTOR
GEORGES ERNEST WAGNER
BY Young, Emery & Thompson
ATTORNEYS Patented Dec. 6, 1938

2,138,990

UNITED STATES PATENT OFFICE 2,138,990

COOLING DEVICE FOR ELECTRIC GENERATORS

Georges Ernest Wagner, Saint-Etienne (Loire), France, assignor to "Ergavia S. A.", Lausanne, Switzerland, a corporation Application January 6, 1937, Serial No. 119,360
In France February 14, 1936

2 Claims. (Cl. 171—252)

It is a known fact that in electric machines, whether motors or generators, the power is limited chiefly by the heating of the parts, and in order to obtain a greater power from such machines, with a reduced size and weight, means are employed for their ventilation, thus cooling the parts in which the temperature may rise to a dangerous degree.

In the machines of the open type, such ventilation is relatively easy, and various known devices give satisfactory results, but in the case of machines of the enclosed type, such as the electric machines carried by airplanes or other aircraft, it is a more difficult matter to provide for the cooling of the internal parts, and although certain devices have been brought out for the purpose, a method giving entire satisfaction has not hitherto been proposed.

The question is still further complicated when the machine is obliged to operate with equal facility in both directions of rotation.

The present invention relates to a cooling arrangement for electric machines of the enclosed type, which is adapted for a great discharge of heat without complicating the internal construction of the machine, and is applicable to machines adapted for rotation in both directions, as readily as to others.

In the said device, the shaft of the machine carries a blower situated in the interior of the enclosed frame of the machine and operating in an annular chamber which is the starting point of tubes traversing the machine frame in such way as to effect the cooling of the internal atmosphere.

In the case in which the machine is called upon to rotate in either direction, the inlet ends of the said tubes are preceded by two convergent conduits separated by a pivoted flap, and thus, when the air from the blower enters one of the said conduits, the other conduit is closed by the flap and the air circulated only in the first-mentioned tube.

If necessary, orifices having a suitable direction are provided at the periphery of the blower chamber in such way that a portion of the air will be discharged directly at the exterior of the machine, thus producing a current of air adapted for the cooling of the surface.

The said invention is represented by way of example in the accompanying drawings.

Figs. 4 and 5 are sections on the line IV—IV of Fig. 3, showing two possible positions of the pivoted flap.

Fig. 6 is a longitudinal section of an electric machine provided with a modified form of the device.

Figure 1:
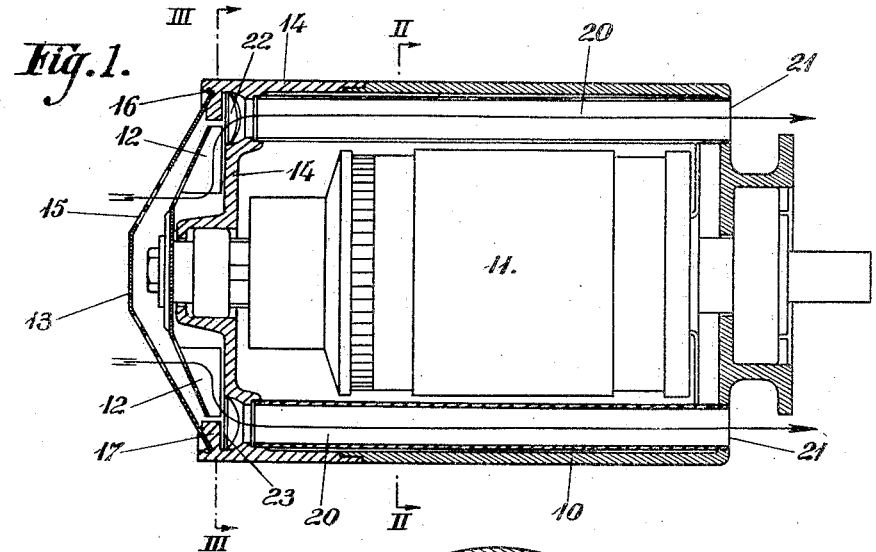
Fig. 1 is a longitudinal section of an electric machine provided with the cooling device in conformity with the invention.

The construction of the electric generator itself, which is shown in these figures, offers no particular features. The machine frame 10 is of enclosed construction; so that the internal atmosphere will have no communication with the exterior.

If necessary, a suitable device may be provided upon the rotor 11 of the machine in order to circulate, in a closed circuit, the internal atmosphere of the machine, but this is not obligatory.

In conformity with the invention, on the outer end of the shaft of the rotor 11 is mounted a centrifugal blower 12 having radial blades and operating in a chamber formed by a cover 13 pierced with central apertures 15. The said cap is secured by a packing ring 16 to the end-plate 14 by which the machine frame 10 is closed at this end.

Figure 3:
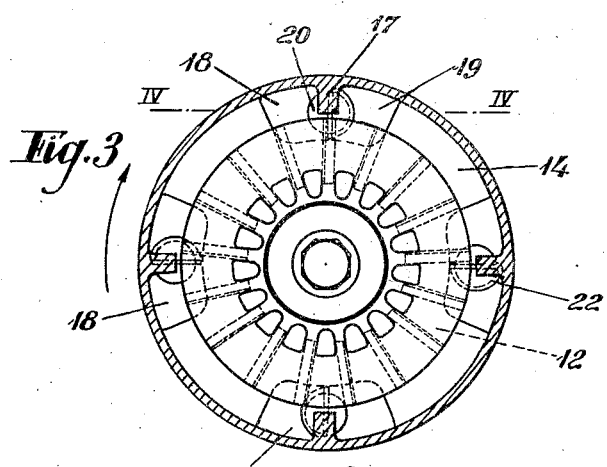
Fig. 3 is a section of the machine on the line III—III of Fig. 1.

The end plate 14 also forms recesses or conduits such as 18 and 19 which have the convergent direction in pairs, as shown in Figs. 3, 4 and 5, and at the meeting points of said conduits, are located the inner ends of respective tubes 20 which extend entirely through the machine and open at the exterior at 21 in the rear of the machine.

Thus the said tubes 20, which are four in number in the present construction, are in contact with the internal atmosphere of the machine, but this latter always remains in enclosed condition.

In front of the inlet end of each tube 20 is mounted a flap 22 pivotally mounted on an axle 23 secured to the end-plate 14. The pivoting movement of the said flap is limited by stops 24 and 25.

In the rear of each flap, the end-plate 14 forms a baffle 17 occupying the space between the blower 12 and the cover 13, and thus the separation between the conduits 18 and 19 is better assured.

The flap 22 is so arranged that when in contact with the stop 25, it will close the conduit 19 (Fig. 4), and when the said flap is in contact with the stop 24, it will close the conduit 18 (Fig. 5).

When the generator is running, the rotor 11 turns in a given direction, and the blower 12 withdraws air from the exterior through the apertures 15 of the cover 13, and delivers this air at the periphery to the conduits 18—19 of the stator.

If the air is sent into the conduits 18 (Figs. 3 and 4), the flaps 22 will in all cases be driven against the stops 25, thus closing the conduits 19, and the air will be obliged to enter the tubes 20, as shown by the arrow in Fig. 4.

Figure 2:
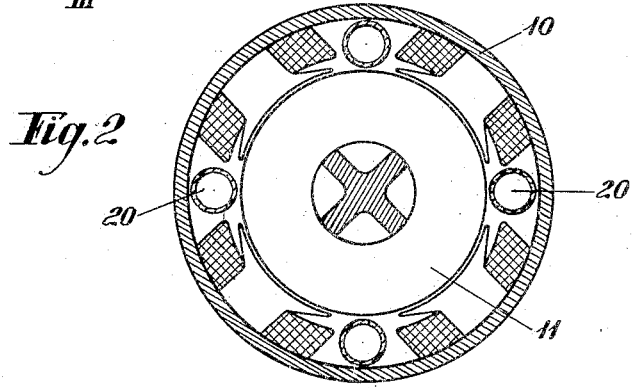
Fig. 2 is a section of said machine on the line II—II of Fig. 1.

If the rotor turns in the opposite direction, the air will be driven into the conduits 19, as shown in Fig. 5, so that the flaps 22 will close the conduits 18, and the air will be again obliged to pass through the tubes 20. The said tubes, as shown in Figs. 1 and 2, are surrounded by the internal atmosphere of the electric machine, and they receive heat from this atmosphere, which becomes heated during the operation of the machine. This heat is at once absorbed and carried off by the fresh air circulating through the tubes 20, so that the internal atmosphere of the machine and hence the parts of the latter will be maintained at a moderate temperature, even though the power required of the machine is considerable, relatively to its size.

In current practice, airplanes and like aircraft carry electric generators which, for evident reasons, are made as small and light as possible.

In consequence, such machines are subject to a considerable heating, and usually operate at a temperature which is just below the melting point of the solder at the joints, and thus the least overload will cause the separation of the soldered parts and the destruction of the machine.

The device according to the invention obviates this disadvantage.

The internal cooling of the machine may be combined with an external cooling of the frame 10. For this purpose, as shown in Fig. 6, a flanged part 26 is formed at the periphery of the end-plate 14 in order to cover the openings 27 provided in the said end-plate.

When the blower 12 is in operation, a portion of the air passes through the openings 27 and is deflected downwardly by the flange 26 against the outer surface of the frame 10, thus providing an additional cooling for the machine.

Obviously, the invention is not limited to the embodiments herein described, and according to requirements, the said device is susceptible of modifications or simplifications, without departing from the spirit of the invention. Thus if the machine is constructed in such way that the rotor 11 will always rotate in the same direction; it will no longer be necessary to employ the arrangement of double conduits 18—19 and the directing flap 22, as it will now be sufficient to use a single conduit having the proper direction. In like manner, a flanged part similar to the one shown at 26 may be provided at the outlet 21 of the tubes 20, in order to deflect the air escaping from such tubes upon the frame 10.

I claim:

1. A dynamo-electric machine comprising a stator in an enclosed stator casing, a rotor, a fan carried by the rotor outside the stator casing, longitudinal cooling tubes traversing the stator, a pair of converging conduits connecting the periphery of the fan to each cooling tube, and means responsive to the flow of cooling air for closing one conduit and opening the other conduit of a pair according to the direction of rotation of the rotor.

2. A dynamo-electric machine comprising a stator in an enclosed stator casing, a rotor, a fan carried by the rotor outside the stator casing, longitudinal cooling tubes traversing the stator, a pair of converging conduits connecting the periphery of the fan to each cooling tube, and means responsive to the flow of cooling air for closing one conduit and opening the other conduit of a pair according to the direction of rotation of the rotor, said means consisting of a flap freely pivoted at the junction of the pair of conduits with the end of the corresponding cooling tube.

GEORGES ERNEST WAGNER.